US009514069B1

(12) United States Patent
Fenner (10) Patent No.: US 9,514,069 B1
(45) Date of Patent: Dec. 6, 2016

(54) ENHANCED COMPUTER PROCESSOR AND MEMORY MANAGEMENT ARCHITECTURE

(71) Applicant: Schwegman, Lundberg & Woessner, P.A., Minneapolis, MN (US)

(72) Inventor: Martin Fenner, Stillwater, MN (US)

(73) Assignee: Schwegman, Lundberg & Woessner, P.A., Minneapolis, MN (US)

( * ) Notice: Subject to any disclaimer, the term of this patent is extended or adjusted under 35 U.S.C. 154(b) by 466 days.

(21) Appl. No.: 13/901,517

(22) Filed: May 23, 2013

Related U.S. Application Data

(60) Provisional application No. 61/651,228, filed on May 24, 2012.

(51) Int. Cl.
| G06F 12/10 | (2016.01) |
| G06F 13/42 | (2006.01) |
| G06F 13/28 | (2006.01) |
| G06F 13/16 | (2006.01) |
| G11C 7/10 | (2006.01) |

(52) U.S. Cl.
CPC ............ *G06F 13/28* (2013.01); *G06F 12/1081* (2013.01); *G06F 13/1663* (2013.01); *G06F 13/4234* (2013.01); *G11C 7/1072* (2013.01); *G06F 2213/0026* (2013.01)

(58) Field of Classification Search
CPC .. G06F 13/4234; G06F 12/10; G06F 12/1081; G06F 2213/0026; G06F 13/1663; G06F 13/28
USPC ........................................................ 710/316
See application file for complete search history.

(56) References Cited

U.S. PATENT DOCUMENTS

| 5,784,706 | A | 7/1998 | Oberlin et al. |
| 5,799,209 | A | 8/1998 | Chatter |
| 5,974,487 | A | 10/1999 | Hartmann |
| 6,038,630 | A | 3/2000 | Foster et al. |
| 6,108,725 | A | 8/2000 | Chatter |
| 6,119,215 | A | 9/2000 | Key et al. |
| 6,145,072 | A | 11/2000 | Shams et al. |
| 6,154,816 | A | 11/2000 | Steely et al. |
| 6,209,020 | B1 | 3/2001 | Angle et al. |

(Continued)

OTHER PUBLICATIONS

Freescale Semiconductor, "QorIQ P4080 Communications Processor Product Brief", (Sep. 2008), 36 pgs.

(Continued)

*Primary Examiner* — Glenn A Auve
(74) *Attorney, Agent, or Firm* — Schwegman Lundberg & Woessner, P.A.

(57) ABSTRACT

Disclosed in some examples is an improved computing architecture, which includes multiple processor cores and I/O devices communicating with multiple memory banks using a High Speed Interconnect Unit (HSU). The HSU quickly routes (e.g., in one clock cycle) a memory access request from an I/O device or a processor core to a particular memory bank over one of a number of independent memory routes, each memory route servicing a particular memory bank. The routing is based upon the values of preselected bit positions ("preselected bits") in the requested memory address, the preselected bits being chosen so as to maximize the distribution of memory accesses of the entire system across all available memory banks (and by extension distributing the memory accesses across the available memory routes).

26 Claims, 3 Drawing Sheets

(56) References Cited

U.S. PATENT DOCUMENTS

| | | |
|---|---|---|
| 6,212,597 B1 | 4/2001 | Conlin et al. |
| 6,301,637 B1 | 10/2001 | Krull |
| 6,550,020 B1 | 4/2003 | Floyd |
| 6,643,755 B2 | 11/2003 | Goodhue |
| 6,665,755 B2 | 12/2003 | Modelski et al. |
| 6,687,796 B1 | 2/2004 | Laine et al. |
| 6,691,216 B2 | 2/2004 | Kelly et al. |
| 6,823,429 B1 | 11/2004 | Olnowich |
| 6,854,118 B2 | 2/2005 | Kalafatis et al. |
| 6,895,479 B2 | 5/2005 | Reimer et al. |
| 6,915,402 B2 | 7/2005 | Wilson et al. |
| 6,931,489 B2 | 8/2005 | DeLano et al. |
| 6,988,149 B2 | 1/2006 | Odenwald |
| 7,076,609 B2 | 7/2006 | Garg et al. |
| 7,089,340 B2 | 8/2006 | Penkovski |
| 7,120,761 B2 | 10/2006 | Matsuzaki et al. |
| 7,188,262 B2 | 3/2007 | Arends |
| 7,194,577 B2 | 3/2007 | Johnson |
| 7,209,996 B2 | 4/2007 | Kohn et al. |
| 7,394,288 B1 | 7/2008 | Agarwal |
| 7,461,208 B1 | 12/2008 | Caprioli et al. |
| 7,464,197 B2 | 12/2008 | Ganapathy et al. |
| 7,505,353 B2 | 3/2009 | Kim |
| 7,521,961 B1 | 4/2009 | Anderson |
| 7,529,907 B2 | 5/2009 | Nemirovsky et al. |
| 7,568,064 B2 | 7/2009 | Reblewski |
| 7,673,103 B2 | 3/2010 | Chaudhry |
| 7,685,376 B2 | 3/2010 | Zimmer et al. |
| 7,689,738 B1 | 3/2010 | Williams |
| 7,765,547 B2 | 7/2010 | Cismas |
| 7,870,306 B2 | 1/2011 | Wilkinson |
| 7,873,785 B2 | 1/2011 | Olukotun |
| 7,886,084 B2 | 2/2011 | Chen et al. |
| 7,913,010 B2 | 3/2011 | Hoover |
| 7,917,703 B2 | 3/2011 | Camparan et al. |
| 7,991,978 B2 | 8/2011 | Kuesel et al. |
| 8,006,026 B2 | 8/2011 | Kajigaya |
| 8,040,799 B2 | 10/2011 | Hoover |
| 8,099,561 B2 | 1/2012 | Bayer et al. |
| 8,195,884 B2 | 6/2012 | Hoover |
| 8,214,618 B2 | 7/2012 | Jeong |
| 8,214,845 B2 | 7/2012 | Hoover |
| 2008/0307422 A1 | 12/2008 | Kurland et al. |
| 2008/0320240 A1 | 12/2008 | Savic |
| 2009/0125685 A1* | 5/2009 | Bayer ............... G06F 13/4243 711/149 |
| 2009/0193287 A1 | 7/2009 | Jeong |
| 2009/0240866 A1 | 9/2009 | Kajigaya |
| 2009/0271590 A1* | 10/2009 | Carmona et al. ............. 711/206 |
| 2010/0208540 A1* | 8/2010 | Shiu ..................... G11C 8/12 365/230.03 |
| 2010/0293345 A1 | 11/2010 | Sonnier et al. |
| 2012/0210069 A1* | 8/2012 | Bayer ................. G06F 12/084 711/122 |

OTHER PUBLICATIONS

Lee, Chang Joo, et al., "Improving Memory Bank-Level Parallelism in the Presence of Prefetching", MICRO'09, (2009), 10 pgs.

Muralidhara, Sai Prashanth, et al., "Reducing Memory Interference in Multicore Systems via Application-Aware Memory Channel Partitioning", MICRO'11, 2011,Porto Alegre,Brazil, (2011), 12 pgs.

Srinivasan, Krishnan, "Optimizing Memory Bandwidth in Systems-on-Chip", (May 2, 2011), 21 pgs.

Wang, Jian, et al., "Software Programmable Data Allocation in Multi-Bank Memory of SIMD Processors", 13th Euromicro Conference on Digital System Design: Architectures, Methods and Tools, (2010), 6 pgs.

Sandler, Alexander, "Alex on Linux: SMP affinity and proper interrupt handling in Linux", http://www.alexonlinux.com/smp-affinity-and-proper-interrupt-handling-in-linux (last visited Jul. 31, 2014).

Sandler, Alexander, "Alex on Linux: MSI-X—the right way to spread interrupt load", http://www.alexonlinux.com/msi-x-the-right-way-to-spread-interrupt-load (last visited Jul. 31, 2014).

Sandler, Alexander, "Alex on Linux: Why interrupt affinity with multiple cores is not such a good thing", http://www.alexonlinux.com/why-interrupt-affinity-with-multiple-cores-is-not-such-a-good-thing (last visited Jul. 31, 2014).

Wikipedia, "Wikipedia: Message Signaled Interrupts", http://en.wikipedia.org/wiki/Message_Signaled_Interrupts (last visited Jul. 31, 2014).

* cited by examiner

ENHANCED COMPUTER PROCESSOR AND MEMORY MANAGEMENT ARCHITECTURE

CLAIM OF PRIORITY

This patent application claims the benefit of priority, under 35 U.S.C. Section 119 to U.S. Provisional Patent Application Ser. No. 61/651,228, entitled "Enhanced Computer Architecture," filed on May 24, 2012 to Martin Fenner, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Exablade. Inc., All Rights Reserved.

BACKGROUND

Computing applications utilizing large amounts of input and output to and from external devices are becoming increasingly common. Such applications typically require the transfer of large quantities of data between memory, one or more central processing units (e.g., processor cores), and/or external devices. For example, the Peripheral Component Interconnect Express (PCIe) interface utilizes a direct memory access in which the PCIe devices may directly access main memory. These DMA accesses directly contend with the processor cores for memory access. As the amount of DMA accesses grow, typical solutions normally employed to counter sluggish performance (e.g., adding more processing power or memory) become ineffectual as the performance problems relate not to a lack of memory capacity or processing power, but rather to those components spending more time contending for access to the memory bus and less time actually processing the data.

For example, a common computer architecture is a symmetric multiprocessing (SMP) architecture which utilizes multiple processors or multiple processor cores (for multiple core processors the SMP architecture treats each core as a separate processor). All the processors access a shared main memory across a bus and are controlled by a single instance of an operating system. Since the memory is shared amongst all components, contention for access to the memory is common and represents a major challenge to the scalability of this architecture. As already noted, simply adding more or faster processor cores or faster memory begins to lead to diminishing performance gains as the contention for the bus and for memory quickly become major bottlenecks as CPU cycles which might otherwise be used for computing may be idled while waiting for the bus.

One attempt at solving this problem is a Non-Uniform Memory Access (NUMA) architecture, which dedicates different memory banks to different processors. The downside of this architecture (among other things) is that moving data from one processor (e.g., a job or task) to another is expensive and thus load balancing jobs between cores may be time consuming and difficult. This may lead to reduced performance, as additional CPU clock cycles would need to be expended in moving these jobs. Again, this architecture does little to address applications heavy in I/O.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed in some examples is an improved computing architecture, which includes multiple processor cores and I/O devices, each communicating with multiple memory banks using a High Speed Interconnect Unit (HSU). The HSU quickly routes (e.g., in one clock cycle) a memory access request from an I/O device or a processor core to one of the memory banks over one of a number of independent memory routes, each memory route servicing a particular memory bank. The routing decision may be based upon the values of preselected bit positions ("preselected bits") in the requested memory address, the preselected bits being chosen so as to maximize the distribution of memory accesses of the entire system across all available memory banks (and by extension distributing the memory accesses across the available memory routes).

For example, the processor core may issue a memory write request for a particular physical address. The HSU may determine, based upon the value of the bits from the preselected bit positions, upon which memory path to issue the request and subsequently which memory bank to write the address to. The memory bank used to service the request at that address is then determined by the logic in the HSU rather than determined by a sequentially assigned address. For example, a traditional computing system may treat addresses 0x0000-0x000F as being in the first memory bank, whereas 0x0010-0x001F belongs to the second bank. The memory address utilized then corresponds to a particular memory bank. Addresses are typically then assigned sequentially. Thus all memory from bank 1 will be assigned first. In contrast, in the present system, an address of 0x0001 may be routed to bank 1, but address 0x0002 may be assigned to bank 4 (depending on the predetermined bits). The processor is oblivious to this routing, as all requests for this address are sent to the appropriate bank (e.g., the allocation, write requests, read requests, and the like), but the HSU manages this by utilizing the predetermined bits. When a processor wishes to read from this physical address, it issues a read request with this same physical address, which gets routed the same way.

This system may be distinguished from a NUMA architecture in that each memory bank is accessible by each processor core making communications between each core simpler. The architecture is also different from a traditional SMP architecture in that memory requests from a number of cores may be serviced simultaneously. In some examples, the maximum number of simultaneous requests would be the lesser of the number of memory banks and memory routes assuming a perfect distribution of requests). Because each memory bank is not directly assigned to a specific processor, as in a NUMA architecture, contentions are still possible as multiple cores may attempt to access the same memory bank at the same time, however the system is designed to distribute the memory accesses evenly across those available memory banks (and by extension the available memory routes) to minimize these occurrences.

In one embodiment, bits in the memory address are used to select particular memory banks. In one such embodiment, the bits to be used are selected by the system administrator and put into effect following a reset, initialization or context switch. That is, the bits are dynamically selectable at boot time. Preliminary calculations of this system show a dramatic increase in memory access efficiency (on the order of a 20× improvement over traditional architectures).

Figure 1:
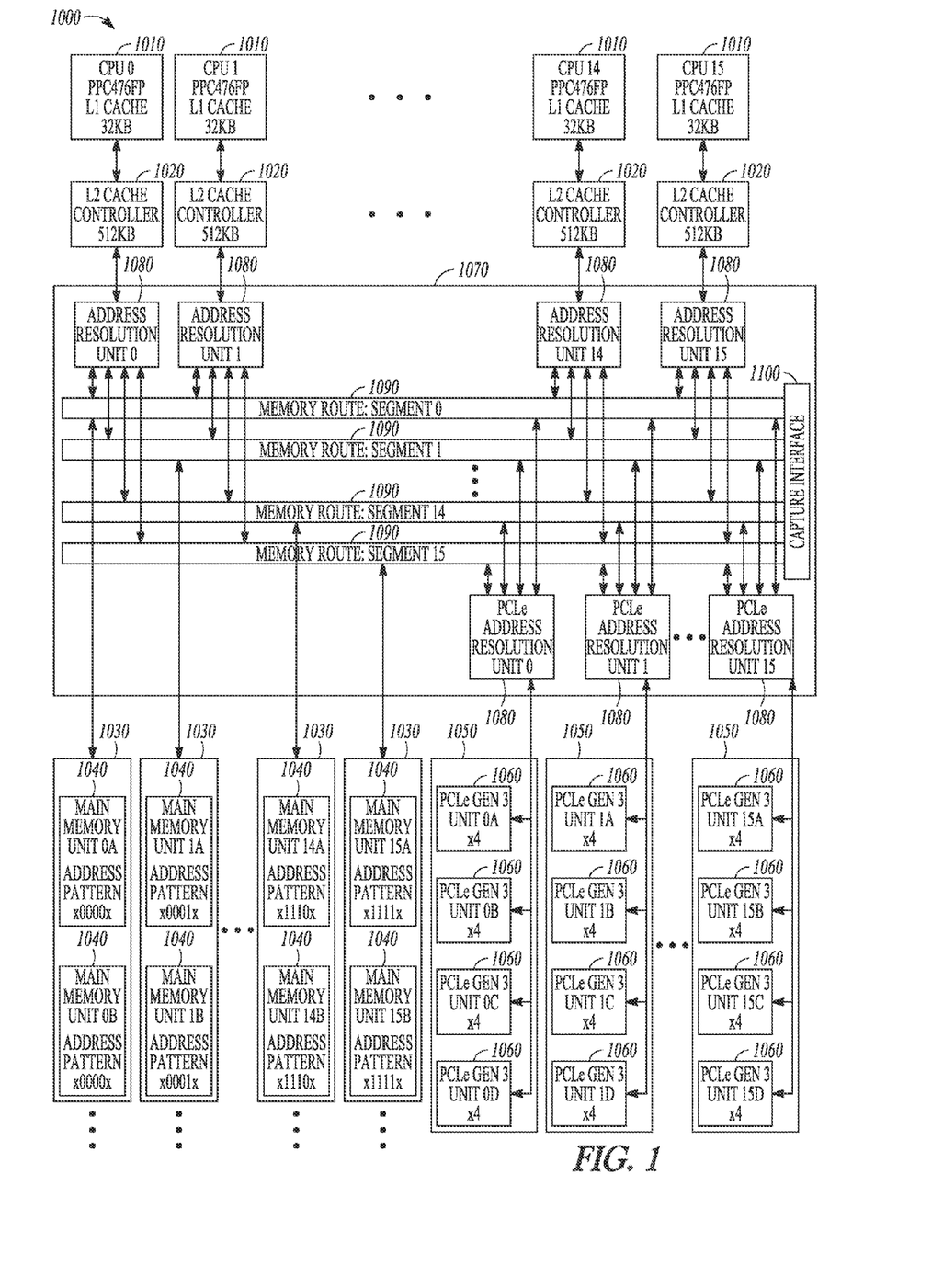
FIG. 1 shows a schematic diagram of a computer according to some examples of the present disclosure.

Turning now to FIG. 1, an example computing architecture 1000 is shown. Architecture 1000 is shown in FIG. 1 with 16 processor cores 1010 (e.g., a PPC476FP). Example processor cores may include processor cores operating in accordance with a Reduced Instruction Set Computing (RISC) design such as a Power PC processor, a Complex Instruction Set Computing (CISC) design such as an 8086 family of processors (×86) or the like. Each CPU core may have a specific Layer 2 cache and separate Layer 2 cache controller 1020. Architecture 1000 also has 16 memory banks 1030 made up of a number of individual memory units 1040. In some examples, the memory may be Hybrid Memory Cube (HMC) memory developed by the Hybrid Memory Cube Consortium whose members include Micron Technology, Inc., of Boise, Id. and Samsung Group of Seoul South Korea. The HMC combines high-speed logic process technology with a stack of through-silicon-via (TSV) bonded memory die. HMC memory is estimated to be 15 times faster than a DDR3 module. In other examples the memory may be any memory with separate data-in and data-out connections along with a first-in-first-out queue (FIFO) for storing unfulfilled memory requests.

Peripheral Component Interconnect Express (PCIe) controllers 1050 comprise a number of PCIe units 1060. CPU cores 1010 and PCIe controllers 1050 each access the main memory (comprised of the sum of the memory banks 1030) through the high speed interconnect unit 1070. While the PCIe interface utilizes Direct Memory Access (DMA) through the HSU 1070, the actual commands to and from the processor cores to initiate the DMA may not occur through the HSU. For example, the processors may access a DMA control unit directly to establish a new transfer and the HSU units may only be used to transport the actual data between memory and the related PCIe interfaces. Additionally, while a PCIe interface is shown in FIG. 1, other types of peripheral connections may be included in the system. Examples include a Universal Serial Bus (USB), IEEE 1394 (Firewire), Peripheral Component Interconnect (PCI), Advanced Graphics Port (AGP), or the like.

High speed interconnect unit 1070 includes a plurality of Address Resolution Units (ARU) 1080. The ARU units are the interface to which a system component issues a memory access request. HSU 1070 also contains a plurality of memory routes (or segments) 1090. In the example of FIG. 1, each segment 1090 is dedicated to servicing memory requests for a single memory bank 1030. In other examples memory routes 1090 may serve multiple memory banks. Each ARU 1080 routes the particular memory request to the correct memory bank 1030 by sending the memory request across the proper segment 1090. The routing decision made by the ARU may be based upon the value of the bits at the predetermined bit positions in the memory address of the request. In the example of FIG. 1, since there are sixteen memory banks, a minimum of four bits may be used to determine the routing of memory requests across sixteen banks of memory. These bits may be contiguous bits (e.g., the four most significant bits of the address, the four least significant bits, four contiguous bits in the middle, or the like), or may be non-contiguous bits. For example, to route a request to memory unit 0A in memory bank 0, the memory address will have a pattern of x0000x. The "0000" is used by the ARU to route the address across memory route segment 0.

In some examples, the HSU may have to convert the interface used to communicate with the processors and the I/O components (which may be serial) to the interface utilized by the memory route or segment 1090 and the memory (which may be a parallel interface with independent read and write paths). The actual memory request and response may be packetized with address information, the request or response data, and a cyclic redundancy check field.

In some examples, the system may include memory mutes or segments 1090 with independent read and write paths along with a FIFO queue at the memory unit 1030. In these examples, once a request is submitted the memory route or segment 1090 may be made available again at the next clock cycle to service another request. In these examples, the ARU may listen on the read paths for responses to requests sent from one of the components it services, or for other data sent to those components. If an ARU discovers a response on one of the read paths for a component it services it may pass along the response to the requesting component. If there is one memory route per memory bank, the memory banks themselves may simply place the response data on the read path contention free. The interested ARU's may simply forward the data up to the interested processors.

In one example embodiment, segments 1090 may include a 64-bit wide data bus in each direction. In another example embodiment, segments 1090 may include a 128-bit wide data bus in each direction. One of ordinary skill in the art with the benefit of Applicant's disclosure will appreciate that segments 1090 may be of any number of bits wide.

In one embodiment, communication offchip is via a SERDES interface. As already noted, many of the components shown in FIG. 1 may be part of one or more ASICs. In some examples, communication to components that are not part of the same unit (e.g., components not on an ASIC) may be facilitated via a SERDES interface. For example, in order to transfer large amounts of data to and from the off-chip components to the on-chip components with the least amount of physical connection points, data may be encoded into a serial stream before it leaves the chip. Data arriving from outside of the chip may then be received serially and then converted into a parallel data stream using multiple lanes of data. The term SERDES stands for SERialize and DESerialize.

As already noted, in some examples the bit positions used to route the memory requests may be determined in advance and loaded at system initialization time. For example, the system may store the particular bits in a bitmask in some non-volatile storage. This bitmask value may be changed and thus the value of the predetermined bit positions used to route memory requests may be changed the next time the system initializes. This may be advantageous in that system performance can be adjusted by changing the predetermined bit positions if it is determined that a high number of contentions are occurring.

Dynamic bit mapping across memory banks is advantageous because it allows the user to select a data mapping appropriate for a particular mix of data and applications. It can also be used to favor particular CPUs or particular I/O channels, if necessary or desired.

Despite the design of the system 1000 to avoid address contentions, there may be situations in which multiple cores request access to the same memory bank 1030 at the same time. To detect these contentions, the ARUs 1080 may be configured to sense a collision. In some examples the ARUs may do this by communicating with each other to determine if a contention is present. Communication may include priorities of who can access the resources, including load balancing between processor accesses. Certain loads may need a bigger share of a certain resource and may therefore receive preferential treatment. The communication between the ARUs will alleviate any bottlenecks or unfair hogging of resources. In some examples, the algorithms that control the communication between the ARUs may be software controlled, while the actual execution of the algorithms are hardware based for maximum speed.

To handle these contention situations, the ARUs 1080 may include queues that hold requests until the proper memory route 1090 is free. In some examples, the HSU 1070 may implement an arbitration scheme such as a round-robin system. Under a round robin arbitration scheme, each ARU with data to send on a memory route is serviced in a round robin fashion. Thus for example, ARU 1 may be serviced prior to ARU 2 if ARU 1 and ARU 2 both wish to send data on segment 0. Once ARU 1 has sent its data, ARU 2 will be able to send its data on the next clock cycle. In some examples, the round robin may also factor in request age to prevent longer wait times if another request comes in for the same segment after the first ARU is serviced and before the next ARU is serviced. Thus for example if ARU 0 and ARU 2 both wish to send data on segment 0 at clock cycle 0 and ARU 0 is serviced first (at clock cycle 0), and at clock cycle 1 (before ARU 2 is serviced) ARU 1 submits a request for segment 0, the request from ARU 2 may be serviced prior to the newly placed request from ARU 1 (e.g., at clock cycle 1).

In some examples, other contention resolution algorithms may be implemented. For example, the choice of which ARU (and thus which core or I/O device) to go first may allow the system to tailor its performance, giving some system components with more important tasks priority. For example, the basic round robin algorithm may be modified to include multiple access opportunities per go-around of the round robin for a particular ARU (which may service an important processor core). This prioritization may be per component (e.g., a particular core or I/O device) or may be per class of component (e.g., processor or I/O bus). For example, all ARUs servicing the I/O bus may be given contention priority over the processor cores if the system is geared toward particularly heavy I/O tasks.

In one example embodiment, as noted above, arbitration is combined with an aging algorithm to ensure the desired performance. This aging algorithm ensures that a request on the ARU is not permanently starved by other, higher priority requests. For example, after a certain amount of time waiting in the queue, the priority of a request may be increased to increase its chances of being granted access to the memory routes. Additionally, the system is capable of avoiding conflicts by changing the particular address bits used to route the memory requests which changes the allocation of memory. This process is typically accomplished during a service or maintenance window.

In one example embodiment, system 1000 is equipped to change the arbitration scheme on the fly. For example, the operating system may change the arbitration system from a round robin system to a priority system based upon a register value or a setting.

While the configuration shown in FIG. 1 (e.g., sixteen cores, sixteen memory banks and sixteen routes) represents one possible configuration, one skilled in the art with the benefit of Applicant's disclosure will appreciate that other configurations are possible. Indeed the system may be dynamically configurable such that the ARUs 1080 may dynamically determine whether all sixteen memory banks 1030 are present at system initialization time and adjust the routing algorithms to reflect the presence or absence of some of the memory banks 1030. For example, if only eight memory banks are present, only eight of the memory routes should be utilized. This allows the system to be more configurable by the end user (e.g., allowing for unused memory slots to produce a cheaper system which may be expanded later).

Figure 2:
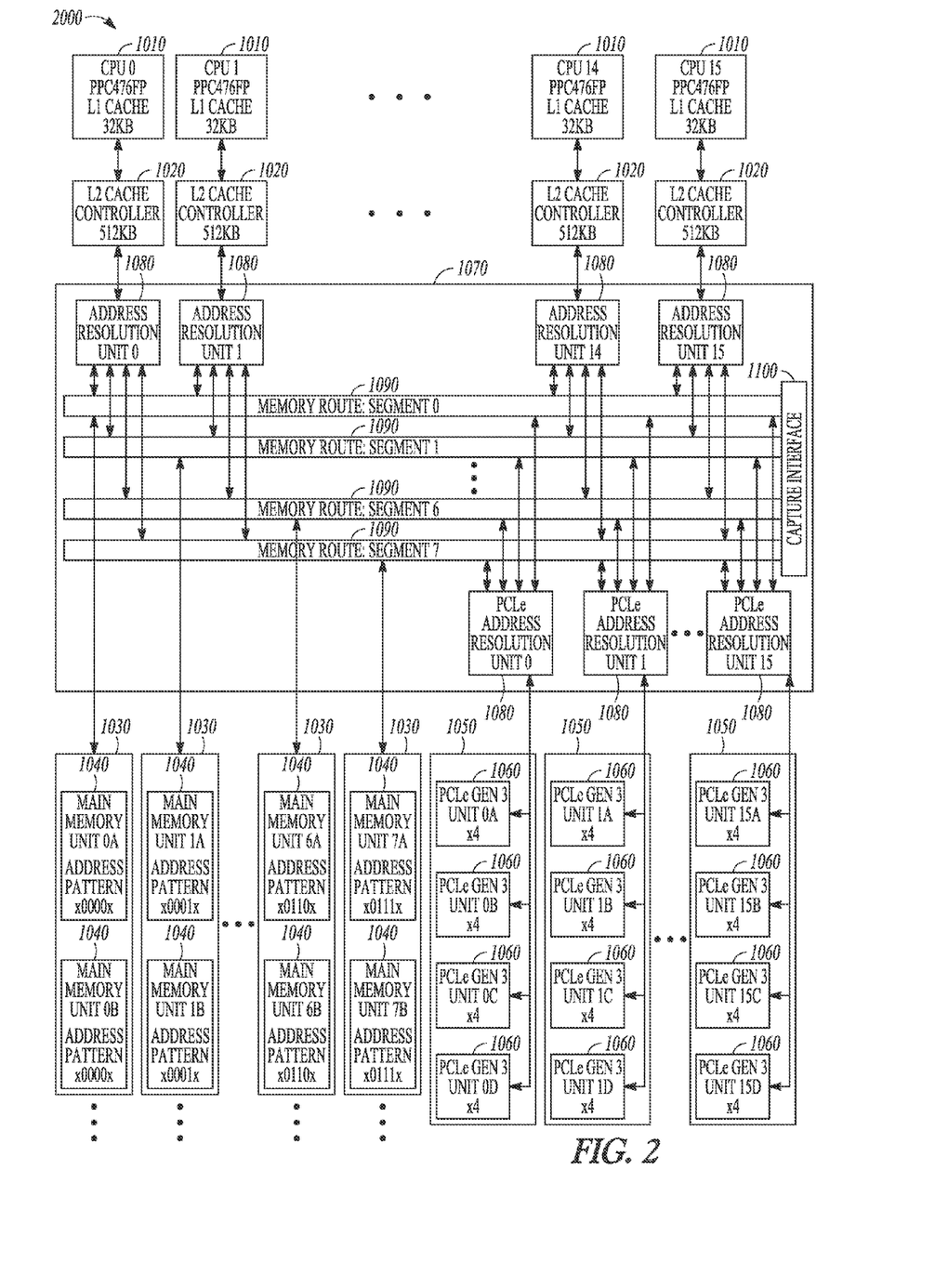
FIG. 2 shows a schematic diagram of a computer according to some examples of the present disclosure.

Additional combinations and permutations are also possible. For example, FIG. 2 shows a system 2000 with only eight memory banks 1040 that may be used with sixteen cores 1010. In this permutation, more contentions are possible, however, if the memory access of the particular applications executing on the system are carefully scrutinized, this may be minimized by carefully choosing the predetermined bit positions used in routing the requests.

Figure 3:
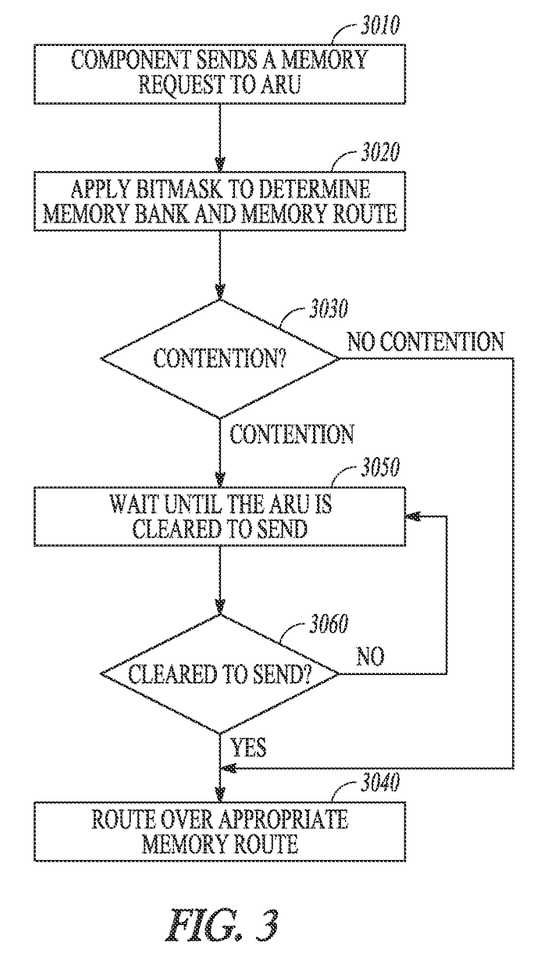
FIG. 3 shows a flowchart of a memory access procedure utilizing the computer architecture of some examples of the present disclosure.

FIG. 3 shows an example method of the operation of the architecture according to some examples of the present disclosure. At operation 3010 a system component that needs to access the main memory of the system sends a memory request (in some examples across a serial bus) to one of the ARUs of the HSU. The ARU determines which memory route and which memory bank to send the request to at operation 3020 utilizing the predetermined bit positions. In some examples the memory route and the memory bank may be mapped one-to-one, that is, each memory bank will have a dedicated memory route. In other examples, multiple memory banks may be serviced by a plurality of different memory routes. In some examples this routing may be implemented using a look up table—for example the ARUs may be programmed to determine which output memory route to send a request on based upon the value of the predetermined bits. Once the memory route is determined, the ARU may check for contentions at 3030. In some examples the plurality of ARUs may communicate with one another to determine whether a collision exists. If there is no collision, the request may be converted from the serial format to a parallel format for transmission across the memory route. The ARU may then send it to the proper memory route at operation 3040. If there is a collision, the ARU buffers the request and waits until the next clock cycle of the HSU at operation 3050. At the next clock cycle, the ARU determines whether or not it is cleared to send (e.g., through determining if it is this ARU's turn based on the round robin or other contention resolution algorithm) at operation 3060. If it is not the ARU's turn to send, the ARU then re-buffers the request and continues to wait. If it is the ARU's turn to send, the ARU may convert the request to parallel and route the request across the proper memory route at operation 3040.

Routing traffic based upon the value of the memory address allows for dynamic routing, which can be changed, based on traffic patterns and other performance criteria. In order to facilitate dynamically altering the routing criteria, in some examples, the HSU may include a counter (for example a 128 bit counter) for each memory path. The counter may be incremented upon an access of that memory path. This information may then be offloaded to a non-volatile location (in some examples at predetermined intervals) and analyzed. A comparison of all the memory path counters will give an indication of disproportional memory usage where one bank of memory is used more often than other memory banks. If the counter for a particular memory path is much larger than the other counters, it indicates that a particular memory path may be congested and that action to increase system performance may be necessary. For example, the predetermined bit positions used to mute memory requests may need to be changed as the memory accesses are not evenly distributed across the entire available memory bandwidth.

Additionally, in some examples, the HSU may also collect and store the actual addresses requested from each core and a timestamp of that request. In some examples the data may be cycle accurate to keep the requested addresses in the original sequence. In some examples to accomplish this, the CPU cores may be slowed down to prevent a data overrun. This collection process may be turned on and off which may allow for a tuning mode whereby the routing algorithms (e.g., the predetermined bit positions used when routing the addresses) may be optimized and a normal execution mode whereby the processor cores run at full speed using the optimized algorithm. To offload this data, a data capture interface (1100 in FIGS. 1 and 2) may interface with the HSU.

In some examples the data collected (e.g., the counters and/or the memory request/timestamp info) may be displayed on a graphical user interface in order to allow a user to assess the performance of the HSU and of the system as a whole.

The computing architecture described herein leads to significant improvement in memory access times and thus system performance. This type of architecture may have broad ranging applicability to a variety of systems. Some examples include systems managing large file-systems, systems executing financial applications (where milliseconds may make a large impact in terms of dollars made or lost), in-memory databases, government numerical processing applications, content streaming applications, search engine applications, or the like.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors or components can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Method examples described herein can be machine or computer-implemented at least in part. Some examples can include a computer-readable medium or machine-readable medium encoded with instructions operable to configure an electronic device (e.g., configure a hardware processor to constitute a particular module) to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

OTHER EXAMPLES

Example 1

A computing system comprising: A high-speed interconnect unit (HSU) comprising: a plurality of address resolution units (ARU), each ARU servicing memory requests for only one of a plurality of processor cores and communicatively coupled to the processor core it services; a plurality of memory routes, each memory route communicatively coupled to each of the plurality of ARUs and to a different one of a plurality of memory interfaces; the ARUs configured to:
receive a memory request from the processor core it services; select one of the plurality of memory routes based upon a predetermined subset of a plurality of address bits in the request; and transmit the request over the selected memory route to the associated memory interface.

Example 2

The computing system of example 1, further comprising: a plurality of processor cores, wherein each processor core is connected to one of the plurality of address resolution units.

Example 3

The computing system of any one of examples 1-2, wherein the plurality of processor cores and the HSU are on a single chip.

Example 4

The computing system of any one of examples 1-3, comprising a plurality of RAM banks coupled to the plurality of memory interfaces and wherein the RAM banks are hybrid memory cubes.

Example 5

The computing system of any one of examples 1-4, wherein the HSU is communicatively coupled to a Peripheral Component Interconnect Express (PCIe) bus, and wherein the HSU further comprises a PCIe address resolution unit (PARU) servicing memory requests for the PCIe interface and communicatively coupled to the plurality of memory routes, the PARU configured to: receive a direct memory access (DMA) request from the PCIe interface; select one of the plurality of memory routes based upon a predetermined subset of a plurality of address bits in the request; and transmit the request over the selected memory route to the associated memory interface.

Example 6

The computing system of any one of examples 1-5, wherein the subset of the plurality of address bits used to route the request is chosen to obtain a substantially even distribution of memory accesses by the plurality of processor cores across the plurality of memory banks.

Example 7

The computing system of any one of examples 1-6, wherein the high speed interconnect is configured to resolve contentions for the same memory route by at least two of the plurality of ARUs by utilizing a round-robin scheduling.

Example 8

The computing system of any one of examples 1-7, wherein the high speed interconnect includes a plurality of registers, one for each of the plurality of memory routes, and wherein the high speed interconnect is configured to increment a register of the plurality of registers associated with the memory route to which a request is routed.

Example 9

The computing system of any one of examples 1-8, comprising a capture interface to capture the address and timestamp of every memory request received by the plurality of ARUs.

Example 10

A method comprising: receiving at one of a plurality of address resolution units (ARU) in a high speed interconnect unit (HSU) a memory access request from one of a plurality of processor cores, each ARU specific to a different one of the plurality of processor cores; selecting, at the ARU communicatively coupled to the one of the plurality of processor cores, one of a plurality of memory routes based upon a predetermined subset of a plurality of address bits in the request, each of the plurality of memory mutes communicatively coupled to each of the plurality of ARUs and to a different one of a plurality of memory interfaces; transmitting the memory request across the selected memory route to the memory interface to which it is communicatively coupled.

Example 11

The method of example 10, comprising: receiving, at a Peripheral Component Interconnect Express (PCIe) address resolution unit (PARU) in the HSU a direct memory access (DMA) request from a Peripheral Component Interconnect Express (PCIe) interface; selecting, at the PARU, one of the plurality of memory routes based upon a predetermined subset of a plurality of address bits in the DMA request, each of the plurality of memory routes communicatively coupled to the PARU; transmitting the memory request across the selected memory route to the associated memory interface.

Example 12

The method of any one of examples 9-11, wherein the subset of the plurality of address bits used to route the request is chosen to obtain a substantially even distribution of memory accesses by the plurality of processor cores across the plurality of memory banks.

Example 13

The method of any one of examples 9-12, comprising: resolving a contention by two of the plurality of ARUs by utilizing a round-robin schedule.

Example 14

The method of any one of examples 9-13, comprising: incrementing a register of a plurality of registers in the HSU associated with the memory route to which a request is routed.

Example 15

The method of any one of examples 9-14, comprising capturing the address and timestamp of every memory request received by the plurality of ARUs using a capture interface to the HSU.

Example 16

A machine-readable medium that stores instructions which when performed by a machine, cause the machine to perform operations comprising: receiving at one of a plurality of address resolution units (ARU) in a high speed interconnect unit (HSU) a memory access request from one of a plurality of processor cores, each ARU specific to a different one of the plurality of processor cores; selecting, at the ARU communicatively coupled to the one of the plurality of processor cores, one of a plurality of memory routes based upon a predetermined subset of a plurality of address bits in the request, each of the plurality of memory routes communicatively coupled to each of the plurality of ARUs and to a different one of a plurality of memory interfaces; transmitting the memory request across the selected memory route to the memory interface to which it is communicatively coupled.

Example 17

The machine-readable medium of example 16, wherein the instructions comprise instructions which when performed by the machine, cause the machine to perform operations comprising: receiving, at a Peripheral Component Interconnect Express (PCIe) address resolution unit (PARU) in the HSU a direct memory access (DMA) request from a Peripheral Component Interconnect Express (PCIe) interface; selecting, at the PARU, one of the plurality of memory routes based upon a predetermined subset of a plurality of address bits in the DMA request, each of the plurality of memory routes communicatively coupled to the PARU; transmitting the memory request across the selected memory route to the associated memory interface.

Example 18

The machine-readable medium of any one of examples 16-17, wherein the subset of the plurality of address bits used to route the request is chosen to obtain a substantially even distribution of memory accesses by the plurality of processor cores across the plurality of memory banks.

Example 19

The machine-readable medium of any one of examples 16-18, wherein the instructions further comprise instructions, which when performed by the machine, cause the machine to perform the operations of resolving a contention by two of the plurality of ARUs by utilizing a round-robin schedule.

Example 20

The machine-readable medium of any one of examples 16-19, wherein the instructions further comprise instructions, which when performed by the machine, cause the machine to perform the operations of incrementing a register of a plurality of registers in the HSU associated with the memory route to which a request is routed.

Example 21

The machine-readable medium of any one of examples 16-20, wherein the instructions further comprise instructions, which when performed by the machine, cause the machine to perform the operations of capturing the address and timestamp of every memory request received by the plurality of ARUs using a capture interface to the HSU.

Example 22

The machine-readable medium of any one of examples 16-21, wherein the RAM is a hybrid memory cube (HMC).

Example 23

A computing system comprising: a plurality of processor cores; a plurality of memory banks; a high speed interconnect unit communicatively coupling the plurality of memory banks to the plurality of processor cores using a plurality of memory routes, the high speed interconnect unit configured to route a memory request from one of the plurality of cores to one of the plurality of memory banks using one of the plurality of memory routes, the one of the plurality of memory banks being selected based upon a subset of a plurality of address bits in the request, the memory route being selected based upon the selected memory bank.

Example 24

The computing system of example 23, comprising a Peripheral Component Interconnect Express interface communicatively coupled to the memory banks through the high speed interconnect unit.

Example 25

The computing system of any one of examples 23-24, wherein the subset of the plurality of address bits used to route the request is chosen to obtain a substantially even distribution of memory accesses across the plurality of memory banks.

Example 26

The computing system of any one of claims 23-25, wherein the high speed interconnect is configured to resolve contentions for the same memory route by two separate cores by utilizing a round-robin scheduling.

Example 27

The computing system of any one of claims 23-26, wherein the high speed interconnect includes a plurality of registers, one for each of the plurality of memory routes, and wherein the high speed interconnect is configured to increment a register of the plurality of registers associated with the memory route to which the request is routed.

Example 28

The computing system of any one of claims 23-27, comprising a capture interface to capture the address and timestamp of the request.

What is claimed is:

1. A computing system comprising:
An interconnect unit comprising:
 a plurality of processor cores;
 a plurality of address resolution units (ARU), each ARU servicing memory requests for only one of the plurality of processor cores and communicatively coupled to the processor core it services;
 a plurality of memory routes, each memory route communicatively coupled to each of the plurality of ARUs and to each of a plurality of memory interfaces;
 each of the ARUs configured to:
  receive a memory request from the processor core it services;
  select one of the plurality of memory routes based upon a predetermined subset of a plurality of address bits in the memory request; and
  transmit the memory request over the selected memory route to each of the plurality of memory interfaces.

2. The computing system of claim 1, wherein the plurality of processor cores and the interconnect unit are on a single chip.

3. The computing system of claim 1, comprising a plurality of RAM banks, each of the plurality of RAM banks coupled to each of the plurality of memory interfaces and wherein the RAM banks are hybrid memory cubes.

4. The computing system of claim 1, wherein the interconnect unit is communicatively coupled to a Peripheral Component Interconnect Express (PCIe) bus, and wherein the interconnect unit further comprises:
 a PCIe address resolution unit (PARU) servicing memory requests for the PCIe interface and communicatively coupled to the plurality of memory routes, the PARU configured to:
 receive a direct memory access (DMA) request from the PCIe interface;
 select one of the plurality of memory routes based upon a predetermined subset of a plurality of address bits in the DMA request; and
 transmit the DMA request over the selected memory route to each of the plurality of memory interfaces.

5. The computing system of claim 1, wherein the subset of the plurality of address bits used to route the memory request is chosen to obtain a substantially even distribution of memory accesses by the plurality of processor cores across the plurality of memory interfaces.

6. The computing system of claim 1, wherein the interconnect unit is configured to resolve contentions for the same memory route by at least two of the plurality of ARUs by utilizing a round-robin scheduling.

7. The computing system of claim 1, wherein the interconnect unit includes a plurality of registers, one for each of the plurality of memory routes, and wherein the interconnect unit is configured to increment a register of the plurality of registers associated with the memory route to which the memory request is routed.

8. The computing system of claim 1, comprising a capture interface to capture the address and timestamp of every memory request received by the plurality of ARUs.

9. A method comprising:
 receiving at one of a plurality of address resolution units (ARU) in an interconnect unit a memory access request from one of a plurality of processor cores, each ARU specific to a different one of the plurality of processor cores;
 selecting at the ARU communicatively coupled to the one of the plurality of processor cores, one of a plurality of memory routes based upon a predetermined subset of a plurality of address bits in the memory access request, each of the plurality of memory routes communicatively coupled to each of the plurality of ARUs and to each of a plurality of memory interfaces;
 transmitting the memory access request across the selected memory route to each of the plurality of memory interfaces to which the selected memory route is communicatively coupled.

10. The method of claim 9, comprising:
 receiving, at a Peripheral Component Interconnect Express (PCIe) address resolution unit (PARU) in the interconnect unit a direct memory access (DMA) request from a Peripheral Component Interconnect Express (PCIe) interface;
 selecting, at the PARU, one of the plurality of memory routes based upon a predetermined subset of a plurality of address bits in the DMA request, each of the plurality of memory routes communicatively coupled to the PARU;
 transmitting the DMA request across the selected memory route to each of the plurality of memory interfaces.

11. The method of claim 10, wherein the subset of the plurality of address bits used to route the DMA request is chosen to obtain a substantially even distribution of memory accesses by the plurality of processor cores across the plurality of memory interfaces.

12. The method of claim 9, comprising: resolving a contention by two of the plurality of ARUs by utilizing a round-robin schedule.

13. The method of claim 9, comprising: incrementing a register of a plurality of registers in the interconnect unit associated with the memory route to which the memory access request is routed.

14. The method of claim 9, comprising capturing the address and timestamp of every memory access request received by the plurality of ARUs using a capture interface to the interconnect unit.

15. A non-transitory machine-readable medium that stores instructions which when performed by a machine, cause the machine to perform operations comprising:
  receiving at one of a plurality of address resolution units (ARU) in an interconnect unit a memory access request from one of a plurality of processor cores, each ARU specific to a different one of the plurality of processor cores;
  selecting, at the ARU communicatively coupled to the one of the plurality of processor cores, one of a plurality of memory routes based upon a predetermined subset of a plurality of address bits in the memory access request, each of the plurality of memory routes communicatively coupled to each of the plurality of ARUs and to each of a plurality of memory interfaces;
  transmitting the memory access request across the selected memory route to each of the plurality of memory interfaces to which the selected memory route is communicatively coupled.

16. The non-transitory machine-readable medium of claim 15, wherein the instructions comprise instructions which when performed by the machine, cause the machine to perform operations comprising:
  receiving, at a Peripheral Component Interconnect Express (PCIe) address resolution unit (PARU) in the interconnect unit a direct memory access (DMA) request from a Peripheral Component Interconnect Express (PCIe) interface,
  selecting, at the PARU, one of the plurality of memory routes based upon a predetermined subset of a plurality of address bits in the DMA request, each of the plurality of memory routes communicatively coupled to the PARU;
  transmitting the DMA request across the selected memory route to each of the plurality of memory interfaces.

17. The non-transitory machine-readable medium of claim 15, wherein the subset of the plurality of address bits used to route the memory access request is chosen to obtain a substantially even distribution of memory accesses by the plurality of processor cores across the plurality of memory interfaces.

18. The non-transitory machine-readable medium of claim 15, wherein the instructions further comprise instructions, which when performed by the machine, cause the machine to perform the operations of resolving a contention by two of the plurality of ARUs by utilizing a round-robin schedule.

19. The non-transitory machine-readable medium of claim 15, wherein the instructions further comprise instructions, which when performed by the machine, cause the machine to perform the operations of incrementing a register of a plurality of registers in the interconnect unit associated with the memory route to which the memory access request is routed.

20. The non-transitory machine-readable medium of claim 15, wherein the instructions further comprise instructions, which when performed by the machine, cause the machine to perform the operations of capturing the address and timestamp of every memory access request received by the plurality of ARUs using a capture interface to the interconnect unit.

21. A computing system comprising:
  a plurality of processor cores;
  a plurality of memory banks;
  an interconnect unit communicatively coupling the plurality of memory banks to the plurality of processor cores using a plurality of memory routes, the interconnect unit including a plurality of address resolution units (ARU), each ARU configured to route a memory request from one of the plurality of cores to one of the plurality of memory banks using one of the plurality of memory routes, the one of the plurality of memory banks being selected based upon a subset of a plurality of address bits in the memory request, the memory route being selected based upon the selected memory bank.

22. The computing system of claim 21, comprising a Peripheral Component Interconnect Express interface communicatively coupled to the memory banks through the interconnect unit.

23. The computing system of claim 21, wherein the subset of the plurality of address bits used to route the memory request is chosen to obtain a substantially even distribution of memory accesses across the plurality of memory banks.

24. The computing system of claim 21, wherein the interconnect unit is configured to resolve contentions for the same memory route by two separate cores by utilizing a round-robin scheduling.

25. The computing system of claim 21, wherein the interconnect unit includes a plurality of registers, one for each of the plurality of memory routes, and wherein the interconnect unit is configured to increment a register of the plurality of registers associated with the memory route to which the memory request is routed.

26. The computing system of claim 21, comprising a capture interface to capture the address and timestamp of the memory request.

* * * * *